United States Patent Office 3,594,382
Patented July 20, 1971

3,594,382
PROCESS FOR THE PREPARATION OF HYDROXY-PHENAZINE-DI-N-OXIDES
Florin Seng, Cologne-Buchheim, and Kurt Ley, Odenthal-Globusch, Germany, assignors to Farbenfabriken Bayer Aktiengesellschaft, Leverkusen, Germany
No Drawing. Filed Jan. 27, 1969, Ser. No. 794,345
Claims priority, application Germany, Jan. 31, 1968,
P 16 70 981.2
Int. Cl. C07d 51/80
U.S. Cl. 260—267
16 Claims

ABSTRACT OF THE DISCLOSURE

Reacting [optionally 4- and/or 5-(chloro, alkyl, alkoxy, aminocarbonyl and/or carboalkoxy)-substituted]-benzo-furazan-N-oxide with at least the equimolar quantity of an aromatic hydroxy compound, e.g. [optionally 2-, 3- and/or 6-(chloro, hydroxy, alkyl, nitro, alkanoyl, aminocarbonyl-alkyl, phenyl, chlorophenyl, phenyl sulfonyl and/or pyrrodiazoly l -alkylaminocarbonyl-alkyl)-substituted]-1,4-di- and -1,3,5-tri-hydroxy-benzenes and [optionally 2-(chloro, hydroxy, alkyl, nitro, alkanoyl, aminocarbonyl-alkyl, phenyl, chlorophenyl, phenyl sulfonyl and/or pyrrodiazolyl-alkyl-aminocarbonyl - alkyl)-substituted]-1,4-hydroxy naphthalenes; optionally in the presence of a diluent, at temperatures of about 0–50° C., and in the presence of a base or basic-reacting salt, to form the corresponding [optionally 1-,3- and/or 4- (chloro, hydroxy, alkyl, nitro, alkanoyl, aminocarbonyl-alkyl, phenyl, chlorophenyl, phenyl sulfonyl and/or pyrrodiazolyl-alkyl aminocarbonyl-alkyl)-substituted]-[optionally 6- and/or 7- (chloro, alkyl, alkoxy, aminocarbonyl and/or carboalkoxy)-substituted] - 2 - hydroxy-phenazine-di-N-oxides, all the corresponding said substituted compounds of which are new, and all of which possess fungicidal properties.

---

The present invention relates to and has for its objects the provision for particular new methods of producing [optionally 1-, 3- and/or 4-(chloro, hydroxy, alkyl, nitro, alkanoyl, aminocarbonyl-alkyl, phenyl, chlorophenyl, phenyl sulfonyl and/or pyrrodiazolyl-alkyl aminocarbonyl-alkyl)-substituted] - [optionally 6- and/or 7-(chloro, alkyl, alkoxy, aminocarbonyl and/or carboalkoxy)-substituted] - 2 - hydroxy-phenazine-di-N-oxides and corresponding ortho-benzo-phenazine-di-N-oxides, all the corresponding said substituted compounds of which are new, and all of which possess fungicidal properties, e.g. in a simple single step reaction, using readily available starting materials whereby to attain outstanding yields, with other and further objects of the invention becoming apparent from a study of the within specification and accompanying examples.

No reaction of benzofurazan-N-oxide with phenols is yet known.

It has now been found, in accordance with the present invention, that certain optionally substituted hydroxy-phenazine-di-N-oxides, all the corresponding substituted compounds of which are new compounds and all of which possess fungicidal properties, of the formula

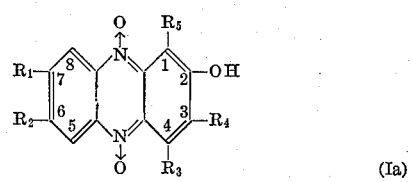

(Ia)

in which:

$R_1$ and $R_2$, each individually, is selected from the group consisting of hydrogen, chloro, alkyl of 1–4 carbon atoms, alkoxy of 1–4 carbon atoms, aminocarbonyl and carboalkoxy of 1–4 carbon atoms in the alkoxy moiety, and at least one of $R_3$, $R_4$, and $R_5$ is hydrogen and the remaining two of such $R_3$, $R_4$ and $R_5$, each individually, is selected from the group consisting of hydrogen, chloro, hydroxy, alkyl of 1–4 carbon atoms, nitro, alkanoyl of 2–4 carbon atoms, aminocarbonyl-alkyl having 1–4 carbon atoms in the alkyl moiety, phenyl, chlorophenyl, phenyl sulfonyl and pyrrodiazolyl-alkyl-aminocarbonyl-alkyl having 1–4 carbon atoms in each corresponding alkyl moiety, with the provision that $R_3$ and $R_4$ when taken together form a component of a fused benzene ring, may be prepared by a process which comprises reacting a benzo-furazan-N-oxide of the formula:

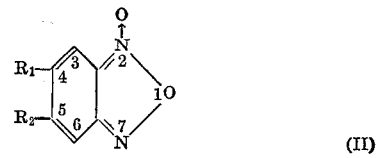

(II)

in which:

$R_1$ and $R_2$ are the same as defined above, with at least the equimolar amount of an aromatic hydroxy compound of the formula:

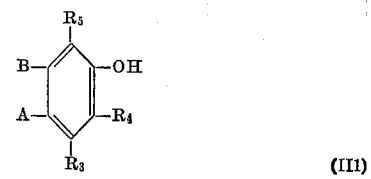

(III)

in which:

$R_3$, $R_4$ and $R_5$ are the same as defined above, and
A and B are hydrogen or hydroxy,
A being hydroxy when B is hydrogen, and B being hydroxy when A is hydrogen and $R_3$ is also hydroxy, optionally in the presence of a diluent, at a temperature substantially between about 0–50° C., and in the presence of catalytic to equimolar amounts of a basic-reacting agent such as a base or basic-reacting salt, with optional neutralizing of the formed di-N-oxide after completion of the reaction by addition of an acid.

In copending U.S. application Ser. No. 794,346, filed simultaneously herewith, an analogous process is described and claimed for the production of ortho-benzo-phenazine-di-N-oxides by reacting an optionally 4- and/or 5-position substituted benzofurazan-N-oxide with an optionally substituted naphthol compound in the presence of a base or basic-reacting salt, and in the presence of a diluent, e.g. at about 0–100° C. Such final compounds are usable as fungicidally active compounds, and all the corresponding substituted compounds are new.

Also, in copending U.S. application Ser. No. 794,347, filed simultaneously herewith, an analogous process is described and claimed for the production of hydroxy-phenazine-di-N-oxides by reacting an optionally 4- and/or 5-position substituted benzofurazan-N-oxide with an optionally substituted quinone compound in the presence of a base or basic-reacting salt and in the presence of a diluent, e.g. at about 0–100° C. Such final compounds are usable as fungicidally active compounds and all the corresponding substituted compounds are new.

It is very surprising, in accordance with the present invention, that benzofurazan-N-oxide can be reacted with phenols to give hydroxy-phenazine-di-N-oxides, in a smooth manner with the splitting off of water. Such a reaction mechanism has not previously been known.

The process of the present invention is illustrated by the following reaction schemes:

[Reaction scheme 1: (IIa) + (IIIa) → (1₁), with NaOH/H₂O, producing benzofurazan-N-oxide + hydroquinone giving phenazine di-N-oxide-ONa + H₂O]

[Reaction scheme 2: (IIa) + (IIIb) → (2₁) + H₂O, with C₄H₉—NH₂ / CH₃OH]

[Reaction scheme 3: (IIa) + (IIIc) → (3₁) + H₂O, with +NH₃ / C₂H₅OH]

Advantageously, in accordance with the present invention, in the various formulae herein:

$R_1$ and $R_2$, each individually, represents hydrogen;
chloro;
lower alkyl of 1–4 carbon atoms such as methyl, ethyl, n- and iso-propyl, n-, iso-, sec.- and tert.-butyl, and the like, especially alkyl of 1–2 carbon atoms;
lower alkoxy of 1–4 carbon atoms such as methoxy, ethoxy, n- and iso-propoxy, n-, iso-, sec-. and tert.-butoxy, and the like, especially alkoxy of 1–2 carbon atoms;
aminocarbonyl, i.e. $NH_2CO$—; or
carbo-lower alkoxy of 1–4 carbon atoms in the alkyl moiety, such as carbo- methoxy to tert.-butoxy inclusive, and the like, as defined above, especially carbo-$C_{1-2}$ alkoxy, i.e. $C_{1-4}$ or $C_{1-2}$ alkoxy carbonyl;

At least one of $R_3$, $R_4$ and $R_5$ represents hydrogen; and

The remaining two of such $R_3$, $R_4$ and $R_5$, each individually, represents hydrogen;
chloro;
hydroxy;
lower alkyl of 1–4 carbon atoms such as methyl to tert.-butyl inclusive, and the like, as defined above, especially alkyl of 1–2 carbon atoms;

nitro;
lower alkanoyl of 2–4 carbon atoms such as acetyl, propionyl, butyryl, and the like, especially $C_{2-3}$ alkanoyl, i.e. $C_{1-3}$ or $C_{1-2}$ alkyl carbonyl, including methyl, ethyl and propyl carbonyl;
aminocarbonyl-lower alkyl of 1–4 carbon atoms such as aminocarbonyl-substituted-methyl to tert.-butyl inclusive, and the like, as defined above, especially aminocarbonyl- $C_{1-2}$ alkyl;
phenyl;
chloro-phenyl such as ortho-, meta- and para-chloro substituted phenyl, especially ortho-chloro-phenyl;
phenyl sulfonyl; or
pyrrodiazolyl-lower alkylaminocarbonyl-lower alkyl of 1–4 carbon atoms in each corresponding alkyl moiety such as 1,2,3-pyrrodiazol-1-yl- methyl to tert.-butyl inclusive, and the like, as defined above, -aminocarbonyl-methyl to tert.-butyl inclusive, and the like, especially 1,2,3-pyrrodiazol-1-yl- $C_{1-2}$ alkyl- aminocarbonyl- $C_{1-2}$ alkyl;

With the proviso that $R_3$ and $R_4$ when taken together form a component of a fused benzene ring, i.e. with the remainder of the N-oxide moiety to which $R_3$ and $R_4$ are connected, e.g. ortho-benzo, and the like; and A represents
hydroxy when B represents hydrogen; and
B represents
hydroxy when A represents hydrogen and $R_3$ also represents hydroxy;
only one of A and B being hydroxy with the other being hydrogen.

In accordance with a preferred embodiment of the invention, $R_1$ is hydrogen, chloro, or $C_{1-4}$ or $C_{1-2}$ alkoxy; $R_2$ is hydrogen, chloro, $C_{1-4}$ or $C_{1-2}$ alkyl, $C_{1-4}$ or $C_{1-2}$ alkoxy, aminocarbonyl or carbo $C_{1-4}$ or $C_{1-2}$ alkoxy; $R_3$ is hydrogen, chloro, hydroxy, $C_{1-4}$ or $C_{1-2}$ alkyl, $C_{2-4}$ or $C_{2-3}$ alkanoyl, phenyl, chloro-, especially ortho-chloro-, -phenyl, or phenyl sulfonyl; $R_4$ is hydrogen, $C_{1-4}$ or $C_{1-2}$ alkyl, nitro, aminocarbonyl- $C_{1-4}$ or $C_{1-2}$ alkyl, pyrrodiazolyl- $C_{1-4}$ or $C_{1-2}$ alkylamino-carbonyl- $C_{1-4}$ or $C_{1-2}$ alkyl, especially 1,2,3-pyrrodiazol-1-yl-$C_{1-4}$ or $C_{1-2}$ alkylamino carbonyl- $C_{1-4}$ or $C_{1-2}$ alkyl; with the proviso that $R_3$ and $R_4$ when taken together form a fused benzene ring with the remainder of the di-N-oxide moiety or starting phenol moiety to which they are attached; $R_5$ is hydrogen; A is hydroxy when B is hydrogen; and B is hydroxy when A is hydrogen and $R_3$ is hydroxy.

In particular, $R_1$, $R_4$ and $R_5$ are hydrogen, and $R_2$ and $R_3$ each individually is hydrogen or chloro.

For the benzofurazan-N-oxide of Formula (II) above usable as starting compounds for the process according to the present invention, there are mentioned by way of example: benzofurazan-N-oxide, and 5-methyl-, 5-ethyl-, 5-n-propyl-, 5-n-butyl-, 5-methoxy-, 5-ethoxy-, 5-n-propoxy-, 5-n-butoxy-, 5-chloro, 5-carbomethoxy-, 5-carboethoxy-, 5-carbo-n-propoxy-, 5-carbo-n-butoxy-, 5-aminocarbonyl-(i.e. 5-carbamido-), and the like, -benzofurazan-N-oxide.

As hydroxy-aromatic compounds of Formula III above usable as starting materials for the process according to the present invention, there are mentioned as examples: hydroquinone, methyl-, 2,3-dimethyl-, ethyl-, tert.-butyl, chloro-, nitro-, methoxy-, n-propoxy-, n-butoxy-, phenyl-, chlorophenyl-, carbonamido-methyl- (i.e. aminocarbonyl-methyl-), and the like, -hydroquinone, acetyl-, propionyl-, butyryl-, phenyl sulfono- (i.e. phenyl sulfonyl-), and the like, -hydroquinone, phloroglucinol (i.e. 1,3,5-trihydroxy benzene), naphthohydroquinone, 2-methylnaphthohydroquinone, and homogentisic acid amide (i.e. 2,5-dihydroxy-toluic acid amide), and the like.

As basic-reacting agents, i.e. bases and basic-reacting salts, there may be mentioned alkali metal alcoholates, especially lower, e.g. $C_{1-5}$, alkanolates such as $KOCH_3$, $NaOCH_3$, and the like, alkali metal hydroxides, carbonates and bicarbonates such as NaOH, KOH, $Na_2CO_3$, $NaHCO_3$, and the like, $NH_3$, as well as amines, e.g. primary, secondary and tertiary organic amines of the general formula:

(IV)

in which:

$R_6$, $R_7$ and $R_8$ are the same or different radicals, such as: hydrogen, alkyl (preferably with 1–12, especially 1–4, carbon atoms, e.g. methyl, ethyl, butyl, etc.), aralkyl (preferably phenyl substituted alkyl with 1–4 carbon atoms in the alkyl moiety, e.g. benzyl, etc.), $R_7$ and $R_8$ possibly also being part of a 5- or 6-membered heterocyclic ring system, which may also contain, as further hereto atoms, oxygen, nitrogen and/or sulfur.

Preferred basic-reacting agents include sodium hydroxide, sodium bicarbonate, ammonia, n-butylamine, triethylamine, cyclohexylamine, piperidine, and the like.

The bases or basic-reacting salts in accordance with the instant process may be used in stoichiometric as well as in catalytic amount, the reaction time being considerably reduced with the use of stoichiometric amounts of the base or basic-reacting salt. The product remains in solution in the form of its salt and can, if desired, subsequently be further reacted. The compound produced according to the present invention can, however, also be isolated by addition of mineral acids or organic acids (especially lower, e.g. $C_{1-4}$, alkanoic acids) such as hydrochloric acid, sulfuric acid, formic acid, acetic acid, and the like.

The reaction is carried out in an inert diluent, e.g. inert liquid solvent, such as water or an inert organic solvent including alcohols, nitriles, formamides and ethers, including aliphatic alcohols, aliphatic nitriles, aliphatic formamides, cycloaliphatic ethers, and the like, e.g. alcohols (preferably with 1–5 carbon atoms, i.e. lower, e.g. $C_{1-5}$ alkanol such as methanol or butanol, etc.), lower alkanoic acid nitrile such as acetonitrile, di lower alkylamide such as dimethyl formamide, cycloaliphatic ethers such as dioxan, tetrahydrofuran, and the like, aromatic hydrocarbons such as benzene, and the like, chlorinated aliphatic hydrocarbons such as carbon tetrachloride, and the like, etc., and mixtures of such solvents.

A temperature range of about 0° C. to about 50° C., preferably between about 20 to about 30° C., is used advantageously.

The reaction may be carried out as follows:

(1) Use of stoichiometric amounts of base 1 mol of the benzofurazan-N-oxide and 1 mol of the hydroxy aromatic compound are provided in a diluent, and 1 mol of base (i.e. the amount of base being based on the amount of benzofuroxazan used), is added dropwise or otherwise introduced. There is obtained with an exothermic reaction an intensely colored solution of salt of the hydroxy-phenazine-di-N-oxide, from which solution the free compound can be obtained by acidification. When working with $NH_3$ in organic solvents or with $NaHCO_3$ in water, the hydroxy-phenazine-di-N-oxides are precipitated.

(2) Use of catalytic amounts of base 1 mol of the benzofurazan-N-oxide and 1 mol of the hydroxy aromatic compound are stirred in the presence of 0.001 to 0.1 mol, preferably 0.05 to 0.1 mol, of base (i.e. the amount of base being based on the amount of benzofuroxazan used). In the course of several hours, the hydroxy-phenazine-di-N-oxide separates as a crystalline compound.

The compounds of Formula Ia above, all of which can be prepared by the process of the present invention, are new, except for 2-hydroxy-phenazine-di-N-oxide.

These compounds represent valuable intermediate products for producing dyestuffs and plant protection agents.

Advantageously, the instant compounds can also be used directly as fungicides for the control of phytopathogenic, seed-born fungi, such as *Tilletia tritici*, *Ustilago avenae*, *Ustilago tritici*, *Fusarium nivale*, *Helminthosporium gramineum*, and the like. In this case, the seed to be protected may be treated in the usual manner with a dressing which contains the substance produced according to the present invention as active compound.

The active compounds produced according to the instant invention can be utilized, if desired, in the form of the usual formulations or compositions with inert conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with inert conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other fungicides, or acaricides, insecticides, nematicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–50%, preferably 10–35%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.01–95%, and preferably 10–95%, by weight of the mixture.

The active compounds can also be used in accordance with the well-known ultra-low-volume process with good success, i.e., by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling fungi, which comprise applying to at least one of (a) such fungi, and (b) their habitat, i.e. the locus to be protected, e.g. seeds, a combative or toxic amount, i.e. a fungicidally effective or toxic amount, of the particular active compound of the invention alone or together with a carrier vehicle as noted above. The instant formulations or compositions are applied in the usual manner, for instance by spraying, atomizing, vaporizing, fumigating, scattering, dusting, watering, sprinkling, pouring, as seed dressing, and the like.

For seed dressing purposes, generally about 0.1–10, preferably 0.5–2, grams of active compound per kilogram of seed, are used.

It will be realized, of course, that the concentration of the particular active compound utilized in admixture with the carrier vehicle will depend upon the intended application. Therefore, in special cases, it is possible to go above or below the aforementioned concentration ranges.

The fungicidal activity of the compounds produced in accordance with the process of the present invention is illustrated, without limitation, by the following example:

EXAMPLE 1

Seed dressing test/bunt of wheat (seed-born mycosis)

To produce a suitable dry dressing, the particular active compound is extended with a mixture of equal parts by weight of talc and kieselguhr to give a finely powdered mixture with the desired concentration of such active compound.

Wheat seed is contaminated with 5 g. of the chlamydospores of *Tilletia caries* per kg. seed. To apply the dressing, the contaminated seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentration in the dressing, the amount of dressing used and the percentage spore germination obtained can be seen from the following Table 1:

TABLE 1.—SEED DRESSING TEST/BUNT OF WHEAT

| Active compound | Concentration of active compound in the dressing in percent by weight | Amount of dressing in g./kg. seed | Spore germination in percent |
| --- | --- | --- | --- |
| (4a₁) 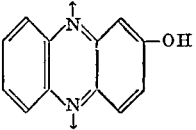 | 30 | 1 | 0.5 |
| (5₁) 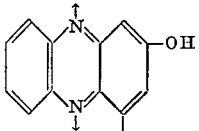 | 30 | 1 | 0.5 |
| (6₁) 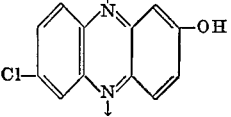 | 30 | 1 | 0. |

The following further examples are set forth to illustrate, without limitation, the process in accordance with the present invention for producing the instant active compounds:

EXAMPLE 2

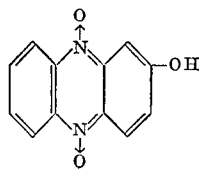

(4a₂)

Process 2a 13.6 g. (0.1 mol) of benzofurazan-N-oxide are suspended in 200 ml. of water. 11 g. (0.1 mol) of hydroquinone and 10 ml. (0.01 mol) of 1 normal solution of sodium hydroxide are added thereto, and stirring is effected for 6 hours. This is followed bp suction filtration, and 20.4 g. (89.4% of the theory) of 2-hydroxy-phenazine-di-N-oxide ($4a_2$) are obtained as red crystals which, after recrystallization from dimethyl formamide (DMF), melt at 255 to 260° C., with decomposition.

*Analysis.*—Calcd. for $C_{12}H_8N_2O_3$ (molecular weight 228) (percent): C, 63.2; H, 3.5; N, 12.2. Found (percent): C, 62.9; H, 3.9; N, 12.2.

Process 2b 13.6 g. (0.1 mol) of benzofurazan-N-oxide and 11 g. (0.1 mol) of hydroquinone are suspended or dissolved in 200 ml. of water. 100 ml. (0.1 mol) of 1 normal solution of sodium hydroxide are added dropwise thereto in the course of 10 minutes. A dark violet solution is formed. The temperature is kept at 25 to 30° C. by occasional cooling. After a further 10 minutes, filtration is effected and the filtrate is acidified with dilute acetic acid. 21 g. (92.2% of the theory) of 2-hydroxy-phenazine-di-N-oxide ($4a_2$) obtained.

Process 2c

To a suspension of 13.6 g. (0.1 mol) of benzofurazan-N-oxide and 11 g. (0.1 mol) of hydroquinone in 200 ml. of water there are slowly added dropwise 10 g. (0.1 mol) triethylamine. A dark solution is formed. After one hour, neutralization is effected with dilute acetic acid, and 20 g. (87.8% of the theory) of 2-hydroxy-phenazine-di-N-oxide ($4a_4$) are obtained.

If, instead of triethylamine, piperidine or cyclohexylamine is used as basic compound, the same results are obtained.

Process 2d 13.6 g. (1 mol) benzofurazan-N-oxide and 110 g. (1 mol) hydroquinone are dissolved in 1,000 ml. methanol. Ammonia is introduced into this solution, and the temperature is kept at 25 to 30° C. by occasional cooling. After three hours, suction filtration is effected, and 204 g. (89.5% of the theory) of 2-hydroxy-phenazine-di-N-oxide ($4a_5$) are obtained. The compound is violet-colored by adherent ammonia.

The following compounds were prepared in analogous manner:

| | | Colors | M.P., °C. | Yield percent | Process |
|---|---|---|---|---|---|
| ($6_2$) | 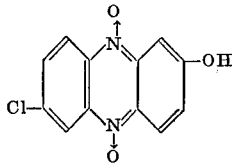 | Red | [1]188 | 88.5 | 2b |
| ($7_1$) | 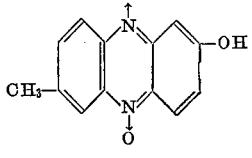 | Red | [1]203 | 95 | 2b |
| ($8_1$) | 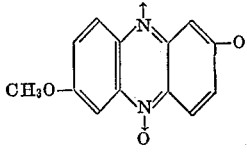 | Red | [1]207 | 77.5 | 2b |
| ($9_1$) | 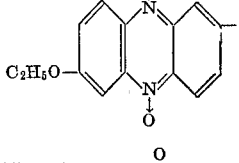 | Red | [1]194–95 | 70.4 | 2b |
| ($10_1$) | 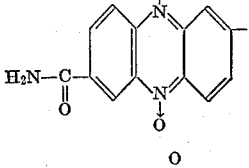 | Red | [2]211 | 58.8 | 2b |
| ($11_1$) | 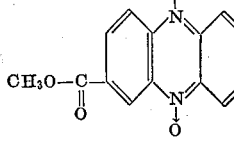 | Red | [1]198 | 70 | 2d |

TABLE—Continued

| | Colors | M.P., °C. | Yield percent | Process |
|---|---|---|---|---|
| (5₂) [phenazine-di-N-oxide with OH and Cl substituents] | Red | ¹210 | 83.6 | 2b |
| (12₁) [phenazine-di-N-oxide with OH and C(CH₃)₃] | Red | ¹188 | 89.5 | 2a |
| (13₁) [phenazine-di-N-oxide with OH and NO₂] | Red | ¹184 | 69.6 | 2d |
| (3₂) [benzo-fused phenazine-di-N-oxide with OH] | Red | ¹217 | 64.8 | 2d |
| (14₁) [phenazine-di-N-oxide with OH and CH₂—CO—NH₂] | Red | ¹288 | 89.5 | 2a |
| (15₁) [phenazine-di-N-oxide with OH and CH₂—CO—NH—CH₂—pyridyl] | Red | ¹160 | 86 | 2a |
| (16₁) [phenazine-di-N-oxide with OH and CH₂—CO—NH—CH₂—CH₂—N(triazole)] | Red | ¹203 | 65.4 | 2a |
| (17₁) [phenazine-di-N-oxide with OH and CO—CH₃] | Red | ¹173 | 90 | 2b |

¹ Decomposition. ² Charred.

EXAMPLE 3

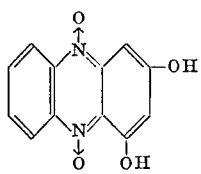

(2₂)

13.6 g. (0.1 mol) of benzofurazan-N-oxide are suspended or dissolved together with 12.5 g. (0.1 mol) phloroglucinol (i.e. 1,3,5-trihydroxy-benzene) in 100 ml. methanol. 7.3 g. (0.1 mol) n-butylamine are added dropwise thereto, and stirring is effected for one hour at 30° C. Neutralization is then carried out with dilute acetic acid, followed by suction filtration. After boiling out with methanol, recrystallization from dimethyl-formamide is effected. 6 g. (31.4% of the theory) of 1,3-dihydroxy-phenazine-di-N-oxide are obtained as red crystals which melt at 215° C. (with decomposition) in a copper block for the determination of melting points preheated to 200° C.

*Analysis.*—Calcd. for $C_{12}H_8N_2O_4$ (molecular weight 244) (percent): C, 59.1; H, 3.8; N, 11.5. Found (percent): C, 59.5; H, 4.2; N, 12.1.

The reaction can also be carried out with ammonia in methanol or with sodium hydroxide solution in water.

The following compounds were prepared in analogous manner:

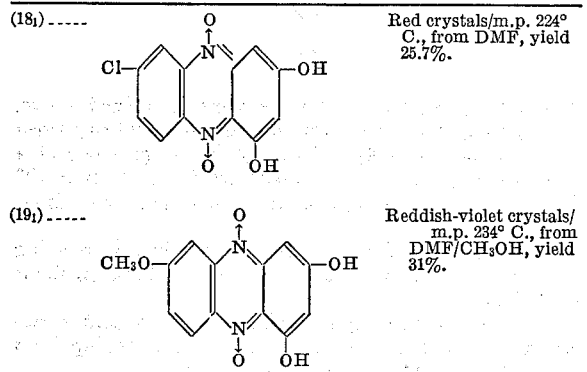

(18₁)  Red crystals/m.p. 224° C., from DMF, yield 25.7%.

(19₁)  Reddish-violet crystals/ m.p. 234° C., from DMF/CH₃OH, yield 31%.

EXAMPLE 4

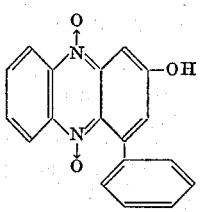

(20₁)

13.6 g. (0.1 mol) benzofurazan-N-oxide are mixed together with 18.6 g. (0.1 mol) 2-phenyl-hydroquinone in 100 ml. methanol. Ammonia is then introduced at 30–32° C. At first, complete solution takes place. After 20 minutes, a substance crystallizes out. Suction filtration is carried out. Solution in 350 ml. of 5% solution of sodium hydroxide is then effected, followed by filtration, and the filtrate is acidified.

19 g. (62.5% of the theory) of red crystals, i.e. 4-phenyl-2-hydroxy-phenazine-di-N-oxide, which, after recrystallization from DMF/CH₃OH, melt at 240° C., with decomposition, are obtained.

*Analysis.*—Calcd. for $C_{18}H_{12}N_2O_3$ (molecular weight 304) (percent): C, 71.2; H, 3.95; N, 9.2. Found (percent): C, 70.9; H, 4.3; N, 9.4.

The following compound was obtained in analogous manner:

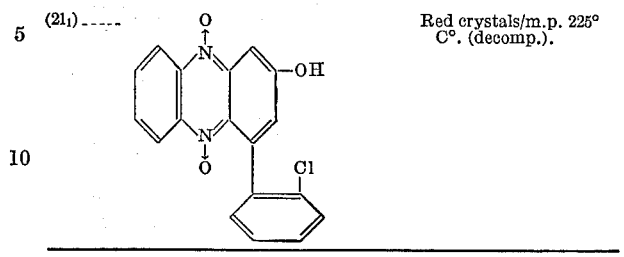

(21₁)  Red crystals/m.p. 225° C°. (decomp.).

EXAMPLE 5

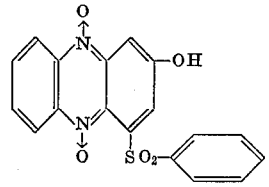

(22₁)

68 g. (0.5 mol) benzofurazan-N-oxide and 125 g. (0.5 mol) 2,5-dihydroxy-diphenyl-sulfon are suspended in 500 ml. water. 200 ml. of 10% solution of sodium hydroxide are added dropwise thereto, with stirring and cooling (temperature not above 30° C.). First, a violet solution is obtained, from which a black-violet substance then precipitates. Stirring is continued for half an hour, and suction filtration is then effected. The residue on the filter is suspended in 400 ml. of water and neutralized with acetic acid. The red crystals formed are filtered off with suction and recrystallized from DMF/CH₃OH. 145 g. (78% of the theory) of 4-phenylsulfonyl-2-hydroxy-phenazine-di-N-oxide, of melting point 177° C. are obtained.

*Analysis.*—Calcd. for $C_{18}H_{12}N_2O_5S$ (molecular weight 368) (percent): C, 58.7; H, 3.26; N, 7.62. Found (percent): C, 58.5; H, 3.5; N, 7.8.

The following compounds were prepared in analogous manner:

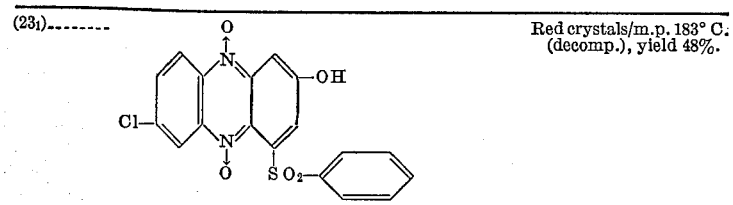

(23₁)  Red crystals/m.p. 183° C. (decomp.), yield 48%.

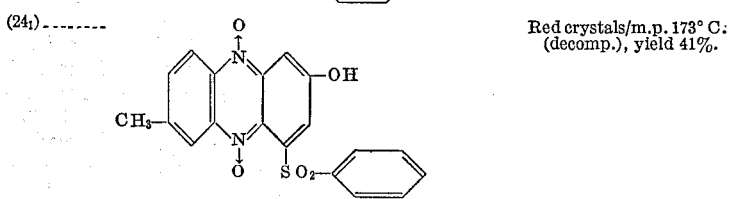

(24₁)  Red crystals/m.p. 173° C. (decomp.), yield 41%.

EXAMPLE 6

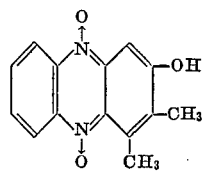

(25₁)

13.6 (0.1 mol) benzofurazan-N-oxide are mixed together with 13.8 g. (0.1 mol) 2,3-dimethyl-hydroquinone in 150 ml. methanol. Ammonia is then introduced for 2 hours and the precipitate is then filtered off with suction. The substance is consequently stirred in 300 ml. of 5% solution of sodium hydroxide and the violet scales formed are filtered off with suction. 20 g. (54.5% of the theory) of 1,2-dimethyl-3-hydroxy-phenazine-di-N-oxide are obtained as sodium salt.

Analysis.—Calcd. for $C_{14}H_{11}N_2O_3Na \cdot 6H_2O$ (molecular weight 376) (percent): C, 44.8; H, 6.13; N, 7.5; Na, 6.15. Found (percent): C, 45.3; H, 6.0; N, 7.8; Na, 6.1.

By acidification, the free compound of decomposition point 218° C. is obtained.

Analysis.—Calcd. for $C_{14}H_{12}N_2O_3$ (molecular weight 256) (percent): C, 65.7; H, 4.8; N, 10.95. Found (percent): C, 65.7; H, 5.0; N, 11.1.

It will be realized by the artisan that all of the foregoing compounds contemplated by the present invention, i.e. produced by the instant process, possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Process for the production of hydroxy-phenazine-di-N-oxides of the formula

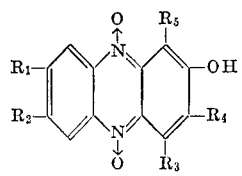

in which $R_1$ and $R_2$, each individually, is selected from the group consisting of hydrogen, chloro, alkyl of 1–4 carbon atoms, alkoxy of 1–4 carbon atoms, aminocarbonyl and carboalkoxy having 1–4 carbon atoms in the alkoxy moiety; at least one of $R_3$, $R_4$ and $R_5$ is hydrogen and the remaining two of such $R_3$, $R_4$ and $R_5$, each individually, is selected from the group consisting of hydrogen, chloro, hydroxy, alkyl of 1–4 carbon atoms, nitro, alkanoyl of 2–4 carbon atoms, aminocarbonyl-alkyl having 1–4 carbon atoms in the alkyl moiety, phenyl, chlorophenyl, phenylsulfonyl, and pyrrodiazolyl-alkyl aminocarbonyl-alkyl having 1–4 carbon atoms in each corresponding alkyl moiety, with the proviso that $R_3$ and $R_4$ when taken together form a component of a fused benzene ring, which comprises reacting a benzofurazan-N-oxide of the formula

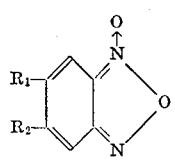

in which $R_1$ and $R_2$ are the same as defined above, with at least the equimolar amount of an aromatic hydroxy compound of the formula

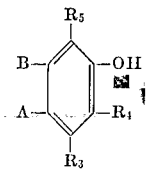

in which $R_3$, $R_4$ and $R_5$ are the same as defined above, A is hydroxy when B is hydrogen, and B is hydroxy when A is hydrogen and $R_3$ is hydroxy, in the presence of a basic-reacting agent at a temperature from about 0–50° C. to form the corresponding hydroxy-phenazine-di-N-oxide.

2. Process according to claim 1 wherein said reacting is carried out at a temperature substantially between about 20–30° C.

3. Process according to claim 1 wherein said basic-reacting agent is used in about an amount ranging from a catalytic amount to an equimolar amount.

4. Process according to claim 1 wherein said basic-reacting agent is used in a catalytic amount ranging substantially between about 0.001–0.1 mol per mol of benzofurazan-N-oxide.

5. Process according to claim 1 wherein said basic-reacting agent is used in substantially an equimolar amount based on the amount of benzofurazan-N-oxide used.

6. Process according to claim 1 wherein said basic-reacting agent is selected from the group consisting of a base and a basic-reacting salt.

7. Process according to claim 1 wherein said basic-reacting agent is selected from the group consisting of alkali metal alcoholates, hydroxides, carbonates and bicarbomates; ammonia; and primary, secondary and tertiary organic amines.

8. Process according to claim 1 wherein said reaction is carried out in the presence of an inert diluent.

9. Process according to claim 1 wherein said reaction is carried out in an inert diluent selected from the group consisting of water and an inert organic solvent.

10. Process according to claim 1 wherein said reaction is carried out in an inert organic solvent selected from the group consisting of aromatic hydrocarbons, chlorinated aliphatic hydrocarbons, cycloaliphatic ethers, aliphatic formamides, aliphatic alcohols, aliphatic nitriles, and mixtures thereof.

11. Process according to claim 1 wherein said reaction is carried out in an inert organic solvent selected from the group consisting of alkanols, alkanoic acid nitriles, dialkyl formamides, cycloaliphatic ethers, benzene, carbon tetrachloride, and mixtures thereof.

12. Process according to claim 1 wherein said reacting is carried out with substantially equimolar amounts of said benzofurazan-N-oxide and aromatic hydroxy compound.

13. Process according to claim 1 wherein the reaction mixture is neutralized with acid to isolate the corresponding free hydroxy compound.

14. Process according to claim 14 wherein said acid is selected from the group consisting of mineral acid and organic acid.

15. Process according to claim 1 wherein $R_1$ is selected from the group consisting of hydrogen, chloro and alkoxy of 1–4 carbon atoms, $R_2$ is selected from the group consisting of hydrogen, chloro, alkyl of 1–4 carbon atoms, alkoxy of 1–4 carbon atoms, aminocarbonyl and carbo alkoxy having 1–4 carbon atoms in the alkyl moiety, $R_3$ is selected from the group consisting of hydrogen, chloro, hydroxy, alkyl of 1–4 carbon atoms, alkanoyl of 2–4 carbon atoms, phenyl, chlorophenyl and phenyl sulfonyl, $R_4$ is selected from the group consisting of hydrogen, alkyl of 1-4 carbon atoms, nitro, aminocarbonyl-alkyl having 1-4 carbon atoms in the alkyl moiety, pyrrodiazolyl-alkyl-amino-carbonyl-alkyl having 1-4 carbon atoms in each corresponding alkyl moiety, with the proviso that $R_3$ and $R_4$ when taken together form a component of a fused benzene ring, $R_5$ is hydrogen, A is hydroxy when B is hydrogen and B is hydroxy when A is hydrogen and $R_3$ is hydroxy.

16. Process according to claim 1 wherein $R_1$, $R_4$ and $R_5$ are hydrogen and $R_2$ and $R_3$, each individually, is selected from the group consisting of hydrogen and chloro.

References Cited

UNITED STATES PATENTS 3,485,832   12/1969   Harris et al. _____ 260—267

ALEX MAZEL, Primary Examiner

A. M. T. TIGHE, Assistant Examiner

U.S. Cl. X.R.

260—266, 295, 307, 308; 425—250

PO-1050
(5/69)

UNITED STATES PATENT OFFICE
CERTIFICATE OF CORRECTION

Patent No. 3,594,382       Dated July 20, 1971

Inventor(s) Florin Seng and Kurt Ley

It is certified that error appears in the above-identified patent and that said Letters Patent are hereby corrected as shown below:

Col. 1, line 20 -   "pyrrodiazoly 1" should be --pyrrodiazolyl--.

Col. 1, line 34 -   after "oxides" insert --and corresponding ortho-benzo-phenazine-di-N-oxides--.

Col. 8, Table 1 -   last figure in last column, "0." should be --0.5--.

Col. 9, line 6 -   "bp" should be --by--.

Col. 9, line 25 -   "($4a_2$)" should be --($4a_3$)--.

Signed and sealed this 15th day of February 1972.

(SEAL)
Attest:

EDWARD M. FLETCHER, JR.     ROBERT GOTTSCHALK
Attesting Officer         Commissioner of Patents